April 16, 1963  A. L. CAUCHOIS ETAL  3,085,825
DEVICES FOR MANIPULATING RADIO-ACTIVE
ARTICLES FROM A DISTANCE
Filed Oct. 23, 1958  3 Sheets-Sheet 1

*INVENTORS*
ANTONIN LOUIS CAUCHOIS,
MICHEL MARCEL VALENTIN ESTAVOYER,
JEAN MARIE LAMAZOU

BY

AGENT

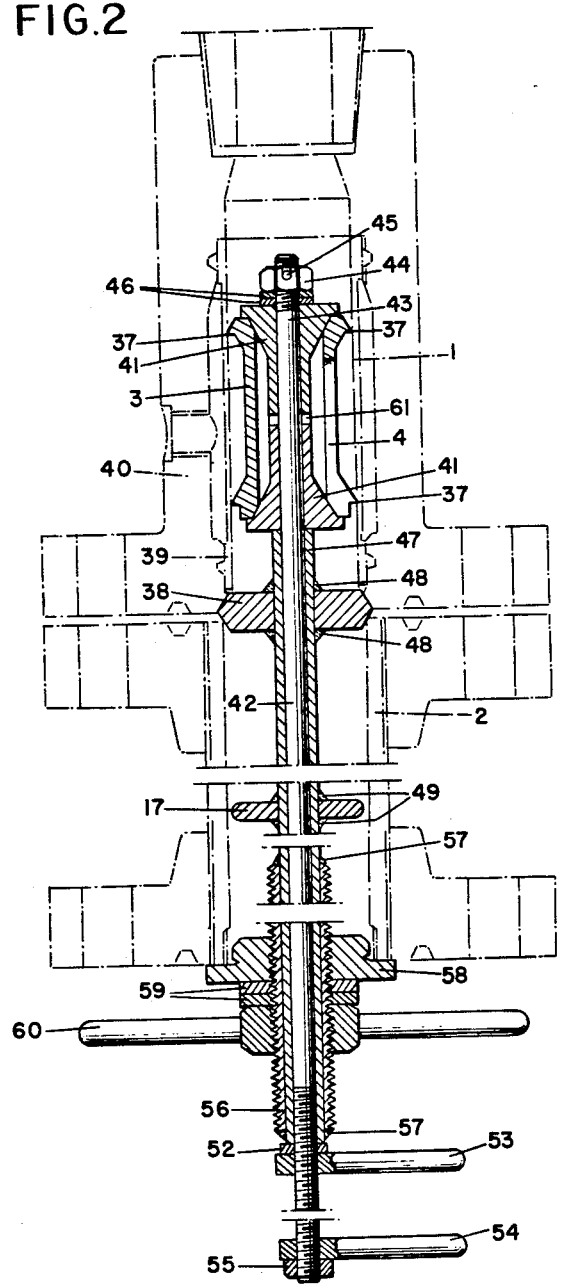

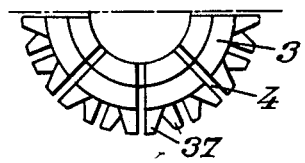
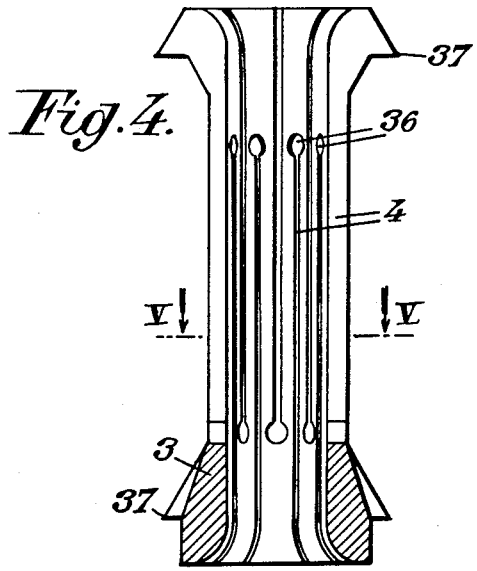
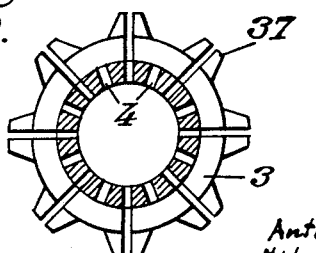

United States Patent Office 3,085,825
Patented Apr. 16, 1963

3,085,825
DEVICES FOR MANIPULATING RADIO-ACTIVE ARTICLES FROM A DISTANCE
Antonin Louis Cauchois, Paris, Michel Marcel Valentin Estavoyer, Pau, and Jean Marie Lamazou, Buros, France, assignors of twenty-five percent to Commissariat a l'Energie Atomique, a French state administration, and seventy-five percent to Societe Nationale des Petroles d'Aquitaine, a French society, both of Paris, France
Filed Oct. 23, 1958, Ser. No. 769,225
Claims priority, application France Oct. 30, 1957
5 Claims. (Cl. 294—86)

The present invention relates to devices for manipulating radio-active articles from a distance. It is more particularly concerned with such devices for use in the method of measuring the corrosion of a metal conduit by a fluid flowing therethrough which consists in inserting a radio-active sample tube section in said conduit and measuring the loss of radio-activity of said sample due to the removal of particles of matter by the effect of corrosion. The device according to the invention is used to introduce the radio-active sample tube section into said conduit or to extract it therefrom.

It has been noted, when carrying out this method, that manipulation of the samples from a distance involves some difficulties. In particular, it is necessary to be able to perform this operation without exerting on the sample forces capable of deforming it. Another condition is that the device for manipulating the sample must permit of applying force to said sample to extract it from the conduit where it may be stuck due to the effect of corrosion, whereas this effort must not cause metallic particles to be torn off from the sample, for instance under the effect of a friction of the manipulating device thereon.

The object of the present invention is to provide a device of the above mentioned kind which is better adapted to meet the requirements of practice than those used for the same purpose up to the present time.

The device according to the present invention includes, in combination, a hollow body mounted on a holding rod serving to displace said body in the above mentioned conduit, said body being provided with expansible means for contacting said sample tube section and means operable from a distance and extending through said rod for expanding said contact means, and it is characterized in that said contact means are arranged to prevent, when in expanded position, any relative displacement between said sample tube section and said contact means.

Preferred embodiments will be hereinafter described with reference to the accompanying drawings, given merely by way of example and in which:

FIG. 2 shows another embodiment of a device according to the present invention, said device being operable mechanically.

FIG. 3 is a fragmentary end view of the expandable tubular contact member of the device of FIG. 2.

FIG. 4 is an axial sectional view of one of the members represented in FIG. 3, shown on an enlarged scale.

FIG. 5 is a cross sectional view on the line V—V of FIG. 4.

Figure 1:
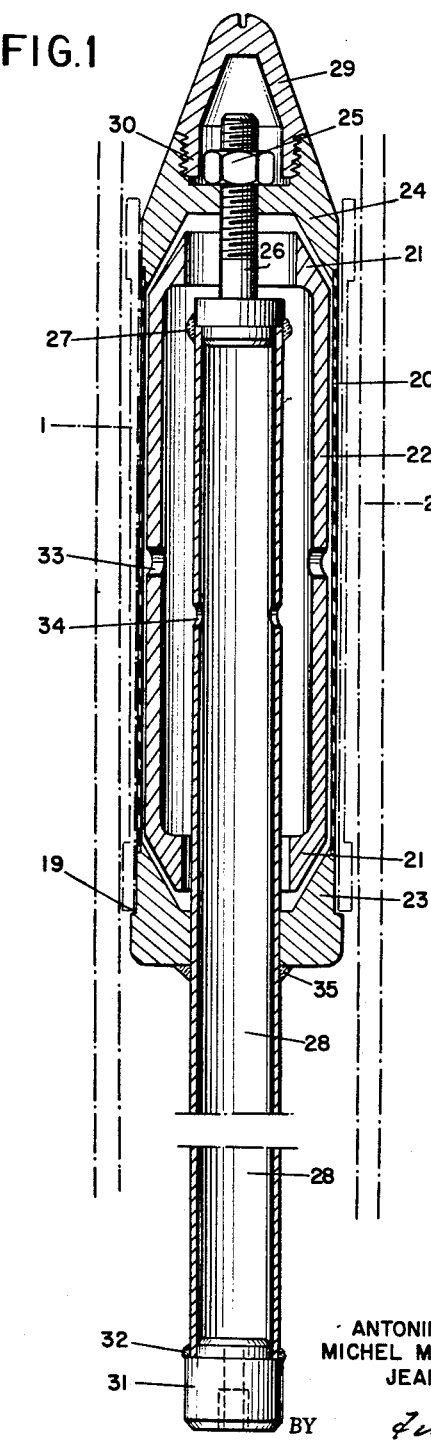
FIG. 1 is an axial sectional view of a first embodiment of a device made according to the present invention, this device being operable through pneumatic means.

In order to place in position a sample tube section 1 in a conduit diagrammatically shown at 2, it is necessary to operate from a distance in order to protect the operator against the noxious effects of ionizing radiations.

For this purpose, according to the invention, we make use of a device the essential element of which is a deformable tubular contact element intended to be introduced in sample tube section 1, this contact element being expansible under the action of means controlled from a distance so that it can, owing to this expansion, be brought into intimate holding contact with the sample tube section, either for placing said sample tube section in position in the conduit or for extracting it therefrom. As above specified, any slipping displacement must be prevented between the sample tube section 1 and the contact element when the latter is in expanded position.

A first embodiment of the invention, making use of pneumatic means, is shown by FIG. 1.

The device according to this embodiment includes a tubular contact diaphragm 20 made of rubber or any other similar resilient material. The ends of this tubular diaphragm are tightly held between two male conical elements 21 rigid with a hollow cylinder 22 and two female conical elements 23 and 24.

A nut 25 is screwed on a threaded rod 26 welded at 27 to the holding rod 28 of the device. Rod 28 carries, welded thereon at 35, one of said conical female elements, to wit element 23. Nut 25 bears against the other female conical element, 24, whereby, when nut 25 is tightened, the two ends of rubber diaphragm 20 are tightly held between, on the one hand, the male conical elements 21 and, on the other hand, the female conical elements 23 and 24. Conical element 24 carries, screwed on one of its ends at 30, a cap 29 which stops air leaks which might take place between threaded rod 26 and said conical element 24. This cap 29 further facilitates the introduction of the device into the sample tube section. The inside of rod 28, which is hollow, is placed in communication with a compressed air source (not shown) by means of a connection 31 welded at 32 on said rod. Of course, any other fluid under pressure might be used. Holes 33 and 34 provided respectively in cylinder 22 and in the portion of rod 28 located inside this cylinder enable air under pressure travelling through rod 28 to flow into the rubber diaphragm 20.

The device is introduced into the irradiated sample tube section 1 until said section is bearing against the shoulder 19 of element 23. Air under pressure fed through rod 28 inflates rubber diaphragm 20 which is thus tightly applied against the inner wall of the sample tube section.

In this position, due to the very large area of contact between diaphragm 20 and sample tube section 1, no slipping can take place between the inner surface of sample tube 1 and diaphragm 20. Such a slipping displacement might in particular tear off metallic particles from the sample tube section, especially when said sample tube section is to be extracted from the conduit where it has remained for some time.

On FIG. 1, rod 28 is shown as extending along the rectilinear axis of part 22. But of course, this rod might be given curvilinear or bent shapes making it possible to introduce it into non-rectilinear conduits. Also, the rod might be arranged so as to extract a hollow article having an axis different from that of rod 28.

It should be noted that the corrosion products sometimes keep the sample tube section stuck to the portion of the conduit in which it is mounted. It is then necessary to pull it off from its housing by applying considerable force without however detaching the deposit formed on the inner wall thereof.

In order to comply with these requirements, we may make use, according to another embodiment of the invention, of a device provided with means capable of penetrating into the inner wall of the sample tube section and having therewith contacts which are nearly point contacts.

An embodiment of such an arrangement is illustrated by FIGS. 2 to 5.

The expansible tubular body is designated by reference numeral 3. Expansibility of this body 3 is obtained by providing it with two series of longitudinal slots 4. The respective slots start alternately from the one or other end of body 3, and extend over a substantial length of the body towards the opposite end thereof, respectively. Each of said slots, at the closed end thereof, forms a circular orifice 36 to prevent cracks in body 3. In order to achieve a non-slipping engagement of body 3 with sample tube 1 as above mentioned, said body 3 is provided, on either side of each of its slots, with sharp projections 37. These projections which, when body 3 is expanded, penetrate into the inner surface of sample tube section 1 achieve the desired engagement of body 3 with sample tube section 1.

We provide a guide 38 which, bearing against one of the edges of sample tube section 1, positions the sharp projections 37 of the tubular body with respect to said sample tube section. In particular, it prevents projections 37 from being located opposite the thicker ends 39 of the sample tube section. These ends are made of greater thickness in order to position the sample tube section in the desired portion of sleeve 40 on which it is bearing. The sharp projections must not be located in this zone as this would block the sample tube section 1 against sleeve 40.

In order to expand tubular body 3, we make use of two cylindrical conical members 41 slidable along control rod 42. This control rod 42 carries, when starting from its end 43, a nut 44 fixed by means of a pin 45, two friction discs 46, the two above mentioned conical members 41, a tube 47 coaxially fixed on said rod 42 and on which are welded, respectively at 48 and 49, the above mentioned guide 38 and a radial guide 17, two friction discs 52, a hand lever 53 screwed on a threaded portion of rod 42, and a fixed hand lever 54 secured on said threaded portion by means of a nut 55.

An externally threaded tube 56 coaxially surrounding tube 47 is welded at 57 thereon. It carries a guide 58, two friction discs 59 and a hand lever 60 screwed on this tube 56. This last mentioned system permits of extracting a sample tube section from conduit 2.

This device works as follows:

The whole is introduced into conduit 2 until guide 38 comes into contact with the lower edge of sleeve 40, the device being centered by guides 38 and 17.

By means of hand lever 53, rod 47 is kept in position and in particular prevented from rotating. A suitable rotation is imparted to rod 42 by means of hand lever 54, which moves the two cylindrical members 41 toward each other and expands tubular body 3, the sharp projections 37 of which are caused to penetrate slightly into the inner wall of the irradiated sample tube section 1.

The whole is extracted from the conduit by imparting a suitable rotation to hand lever 60 which bears through guide 58 upon the edges of conduit 2 so that a high force can thus be applied.

It should be noted that, in order to make it possible to control exactly the depth of penetration of sharp projections 37, the two ends of cylindro-conical members 41 come into contact with each other at 61 when this depth of penetration is obtained.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A device for manipulating from a distance a sample tube section for displacement thereof in a conduit, which comprises, in combination, a holding rod, a hollow expansible tubular body mounted at one end of said rod, said body being a metal sleeve provided with slots parallel to the axis thereof and dimensioned for insertion in said sample tube section, sharp outward projections carried by said body for contacting the inner surface of said sample tube section, two conical members engaged in the open ends of said tubular body in opposed relation to each other with their apexes turned toward each other so that movement of said members toward each other causes expansion of said sleeve, said conical members being so dimensioned that they are brought into contact with each other when said sharp projections have been expanded to the suitable degree to penetrate into the metal of the sample tube section, and means operable from a distance and extending through said tube for forcing said conical members toward each other.

2. A device according to claim 1 in which said means for forcing said members toward each other include a part adapted to bear against the end of said conduit.

3. A device according to claim 1 in which the respective slots starting from the opposed ends of said tubular body are disposed in staggered relation to one another.

4. A device for manipulating from a distance a sample tube section for displacement thereof in a conduit, which comprises, in combination, a holding rod, a hollow cylindrical body mounted at one end of said rod, said body being dimensioned for insertion in said sample tube section, a tubular resilient diaphragm surrounding said body, so as to be tightly applied, when expanded, against the inner surface of said sample tube section, clamping members mounted on said rod at both ends of said hollow body and clamping said diaphragm to said body, one of said clamping members forming a seat for said sample tube section and means operable from a distance for inflating said diaphragm to expand it toward said sample tube section.

5. A device according to claim 4 in which said supporting rod is hollow and constitutes a conduit for feeding gas under pressure to the inside of said tubular diaphragm.

References Cited in the file of this patent

UNITED STATES PATENTS

| | | |
|---|---|---|
| 1,489,705 | Leonard | Apr. 8, 1924 |
| 1,721,021 | Hinderliter | July 16, 1929 |
| 2,374,947 | Nicholson | May 1, 1945 |
| 2,474,047 | Gorzkowski | June 21, 1949 |
| 2,475,748 | Leroy | July 12, 1949 |
| 2,604,170 | Leffler | July 22, 1952 |
| 2,826,445 | Tidland | Mar. 11, 1958 |